United States Patent
Nogawa

(10) Patent No.: US 10,122,272 B1
(45) Date of Patent: Nov. 6, 2018

(54) CYCLE SKIPPING PREVENT CIRCUIT IN A REGULATOR OF A DC-TO-DC CONVERTER

(71) Applicant: Active-Semi, Inc., Tortola (VG)

(72) Inventor: Masashi Nogawa, Sachse, TX (US)

(73) Assignee: Active-Semi, Inc. (VG)

( * ) Notice: Subject to any disclaimer, the term of this patent is extended or adjusted under 35 U.S.C. 154(b) by 0 days.

(21) Appl. No.: 15/859,401

(22) Filed: Dec. 30, 2017

(51) Int. Cl.
*H02M 3/157* (2006.01)
*H02M 3/158* (2006.01)
*H02M 1/08* (2006.01)
*H02M 1/00* (2006.01)

(52) U.S. Cl.
CPC ............ *H02M 3/157* (2013.01); *H02M 1/08* (2013.01); *H02M 3/158* (2013.01); *H02M 2001/0009* (2013.01)

(58) Field of Classification Search
CPC ...... H02M 1/08; H02M 3/155–3/1588; H02M 2001/0009
See application file for complete search history.

(56) References Cited

U.S. PATENT DOCUMENTS

| | | | | |
|---|---|---|---|---|
| 6,137,702 A * | 10/2000 | Hall | | H02M 3/157 323/272 |
| 6,212,079 B1 * | 4/2001 | Balakrishnan | .... | H02M 3/33507 323/284 |
| 6,396,252 B1 * | 5/2002 | Culpepper | ............ | H02M 3/156 323/225 |
| 10,008,939 B2 * | 6/2018 | Zhang | ............... | H02M 3/33507 |
| 2005/0010825 A1 * | 1/2005 | Pullen | ................. | H02M 3/1584 713/300 |
| 2007/0008756 A1 * | 1/2007 | Djenguerian | ........... | H02M 1/32 363/95 |
| 2007/0085520 A1 * | 4/2007 | Ho | ...................... | H02M 3/1588 323/282 |
| 2007/0217095 A1 * | 9/2007 | Choi | ...................... | H02M 1/32 361/18 |
| 2007/0247131 A1 * | 10/2007 | Sohma | .................. | H02M 3/156 323/284 |
| 2008/0246446 A1 * | 10/2008 | Djenguerian | ......... | H02M 3/157 323/234 |
| 2009/0021227 A1 * | 1/2009 | Sase | ........................ | H02M 1/36 323/238 |
| 2009/0237053 A1 * | 9/2009 | Gan | ...................... | H02M 3/156 323/283 |

(Continued)

*Primary Examiner* — Yusef A Ahmed
(74) *Attorney, Agent, or Firm* — Imperium Patent Works; T. Lester Wallace

(57) ABSTRACT

A DC-to-DC converter employs peak current mode control and includes a cycle skipping prevent circuit. If a latch is set, then a high side switch is turned on. A comparator receives a signal indicative of current flow and a compensated error signal. The prevent circuit supplies a delayed version of a low duty cycle, fixed frequency, oscillator signal onto the set input lead of the latch. The prevent circuit gates a high signal as output by the comparator onto the reset input lead of the latch. If the output of the comparator has, however, not transitioned high by a predetermined time, then the prevent circuit gates a high pulse onto the reset input lead. Accordingly, the prevent circuit ensures that the latch is reset once every period of the signal SET. A cycle skipping prevent circuit is also disclosed for use in a converter that employs valley current mode control.

22 Claims, 9 Drawing Sheets

CYCLE SKIPPING PREVENT CIRCUIT IN MORE DETAIL

(56) References Cited

U.S. PATENT DOCUMENTS

| | | | |
|---|---|---|---|
| 2009/0243580 A1* | 10/2009 | Chen | H02M 3/156 323/288 |
| 2009/0302817 A1* | 12/2009 | Nagai | H02M 3/156 323/282 |
| 2012/0133348 A1* | 5/2012 | Fan | H02M 3/1588 323/284 |
| 2014/0218988 A1* | 8/2014 | Hayashi | H02M 3/156 363/126 |
| 2014/0253061 A1* | 9/2014 | Yang | G05F 1/46 323/271 |
| 2015/0054482 A1* | 2/2015 | Min | H02M 3/156 323/283 |
| 2016/0315538 A1* | 10/2016 | Nguyen | H02M 3/1584 |

* cited by examiner

REGULATOR HAVING PEAK CURRENT MODE CONTROL

CYCLE SKIPPING PREVENT CIRCUIT IN MORE DETAIL

CYCLE SKIPPING PREVENT CIRCUIT IN MORE DETAIL

CYCLE SKIPPING PREVENT ENABLED - VALLEY CM

CYCLE SKIPPING PREVENT CIRCUIT IN A REGULATOR OF A DC-TO-DC CONVERTER

TECHNICAL FIELD

The present disclosure relates generally to voltage regulator control circuits, and more particularly to voltage regulator control circuits for controlling DC-to-DC converters using peak current mode control and valley current mode control, and to related circuits and methods.

BACKGROUND INFORMATION

A DC-to-DC converter is a circuit that typically has a control loop or multiple nested control loops. There are various types of control loops and control loop architectures that can be employed. One class of control loop is the so-called current mode control loop. Within the general class of current mode control loops, there are various subcategories including peak, valley, hysteretic, constant on-time, constant off-time, and emulated current mode. Some of these control mode types may be more advantageous in certain applications, whereas other control mode types may be more advantageous in other applications. The various control loop techniques have different characteristics, which may translate into advantages and disadvantages depending on the application.

SUMMARY

In a first novel aspect, a DC-to-DC converter employs peak current mode control and includes a novel cycle skipping prevent circuit. Control circuitry of the DC-to-DC converter includes a latch. If the latch is set, then a high side switch is turned on and is conductive. If the latch is reset, then the high side switch is not turned on. The control circuitry further includes a comparator circuit that receives a voltage signal $V_{CURRENT}$ and a compensated error voltage signal $V_{E-C}$. The voltage signal $V_{CURRENT}$ is indicative of a current flow in the DC-to-DC converter, such as a current flowing out of a switching node of a voltage regulator control integrated circuit and through an inductor external to the integrated circuit. The control circuitry further includes an oscillator circuit. The oscillator circuit outputs an oscillator signal OSC of constant frequency. The oscillator signal OSC is a sequence of high pulses. The oscillator signal OSC has a small duty cycle. In one example, the oscillator signal OSC has a duty cycle of less than twenty-five percent, and more specifically has a period of about five hundred nanoseconds, and has high pulses each of which is fifty nanoseconds in duration.

The cycle skipping prevent circuit receives a RESET0 signal from the output of the comparator circuit and receives the oscillator signal OSC from the oscillator circuit. The cycle skipping prevent circuit supplies a delayed version of the oscillator signal OSC onto the set input lead of the latch in the form of a signal SET. The signal SET has a period that extends from a rising leading edge of a high pulse of the signal SET to a rising leading edge of the subsequent high pulse of the signal SET. The cycle skipping prevent circuit gates a digital logic high signal as output by the comparator circuit onto the reset input lead of the latch if the RESET0 signal as output by the comparator circuit is at a digital logic high level. If the RESET0 signal as output by the comparator circuit has, however, not transitioned to a digital logic high level by a predetermined time in the period then the cycle skipping prevent circuit gates a high pulse onto the reset input lead of the latch. Accordingly, the cycle skipping prevent circuit ensures that the latch is reset once every period of the signal SET.

In a second novel aspect, a DC-to-DC converter employs valley current mode control and includes a novel cycle skipping prevent circuit. Control circuitry of the DC-to-DC converter includes a latch. If the latch is set, then a high side switch is turned on and is conductive. If the latch is reset, then the high side switch is not turned on. The control circuitry further includes a comparator circuit that receives a voltage signal $V_{CURRENT}$ and a compensated error voltage signal $V_{E-C}$. The voltage signal $V_{CURRENT}$ is indicative of a current flow in the DC-to-DC converter. The control circuitry further includes an oscillator circuit. The oscillator circuit outputs an oscillator signal OSC of constant frequency. The oscillator signal OSC is a sequence of high pulses. The oscillator signal OSC has a small duty cycle. In one example, the oscillator signal OSC has a duty cycle of less than twenty-five percent.

The cycle skipping prevent circuit receives a SET0 signal from the output of the comparator circuit and receives the oscillator signal OSC from the oscillator circuit. The cycle skipping prevent circuit supplies a delayed version of the oscillator signal OSC onto the reset input lead of the latch in the form of a signal RESET. The signal RESET has a period that extends from a rising leading edge of a high pulse of the signal RESET to a rising leading edge of the subsequent high pulse of the signal RESET. The cycle skipping prevent circuit gates a digital logic high signal as output by the comparator circuit onto the set input lead of the latch if the SET0 signal as output by the comparator circuit is at a digital logic high level. If the SET0 signal as output by the comparator circuit has, however, not transitioned to a digital logic high level by a predetermined time in the period then the cycle skipping prevent circuit gates a high pulse onto the set input lead of the latch. Accordingly, the cycle skipping prevent circuit ensures that the latch is set once every period of the signal RESET.

The foregoing is a summary and thus contains, by necessity, simplifications, generalizations and omissions of detail; consequently is it appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
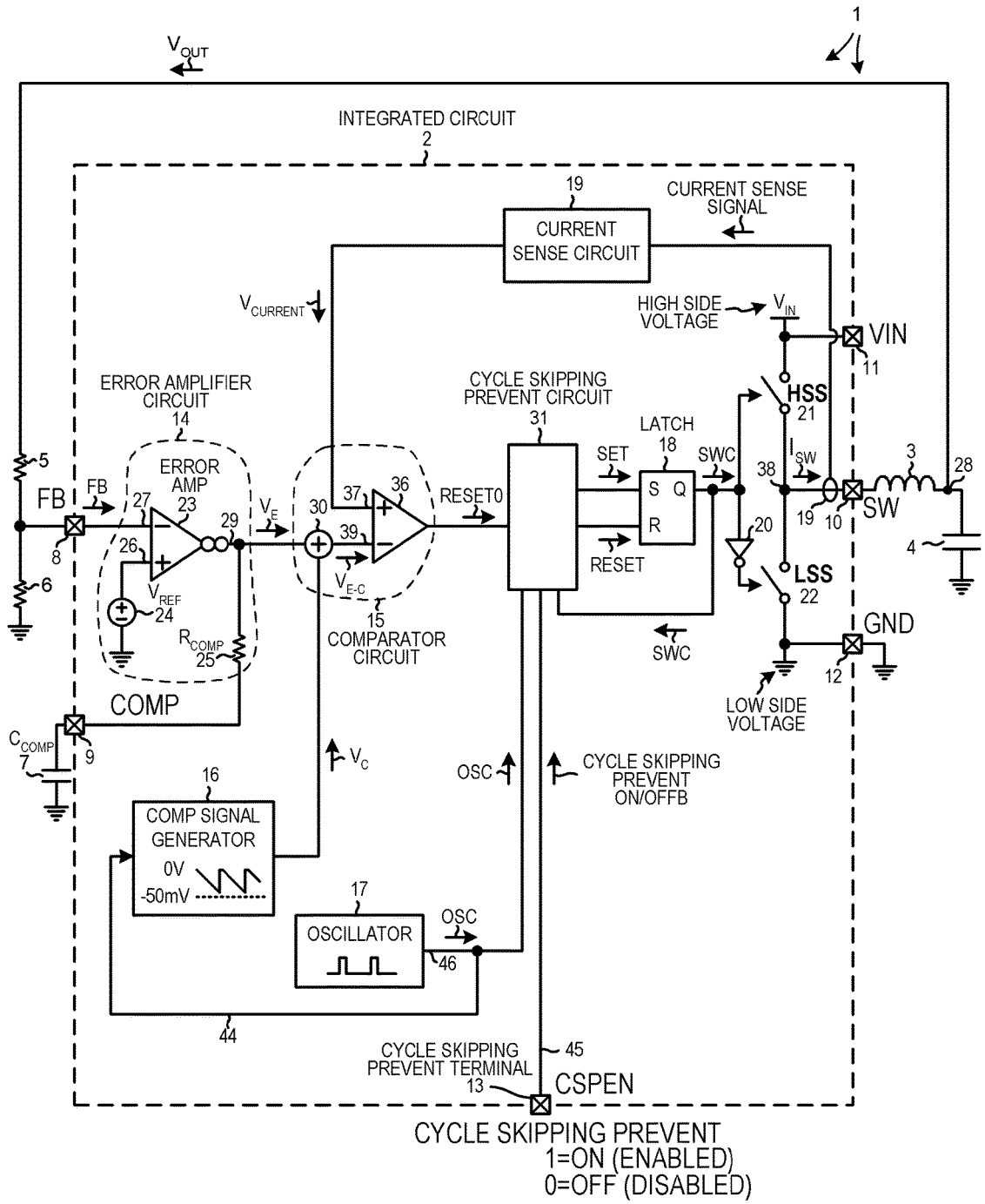
FIG. 1 is a circuit diagram of a DC-to-DC converter that employs peak current mode control and involves a cycle skipping prevent circuit in accordance with a first novel aspect.

FIG. 1 is a circuit diagram of a DC-to-DC voltage converter circuit 1 in accordance with a first novel aspect. Circuit 1 includes a voltage regulator control integrated circuit 2, an inductor 3, an output capacitor 4, feedback voltage divider resistors 5 and 6, and an external compensation capacitor 7. Voltage regulator control integrated circuit 2 includes a feedback integrated circuit terminal FB 8, a compensation integrated circuit terminal COMP 9, an switching integrated circuit terminal SW 10, a supply input voltage integrated circuit terminal VIN 11, a ground integrated circuit terminal GND 12, a cycle skipping prevent terminal CSPEN 13, an error amplifier circuit 14, a comparator circuit 15, a compensation signal generator circuit 16, an oscillator circuit 17, a latch 18, a current sense circuit 19, an inverter 20, a high side switch HSS 21, a low side switch LSS 22, and a cycle skipping prevent circuit 31.

The voltage regulator control integrated circuit 2 is actually packaged in an integrated circuit package (not shown) that has a set of integrated circuit package terminals (not shown). In this example, there is a one-to-one correspondence between the integrated circuit terminals 8-13 shown and the corresponding integrated circuit package terminals. It is the integrated circuit package terminals that actually couple most directly to the external components 3-7. The external components 3-7 are typically soldered, along with the packaged voltage regulator control integrated circuit, on a printed circuit board (not shown). For simplicity of explanation, the extra connections of the package between the integrated circuit terminals and the external components are omitted from the description and explanation below, but it is understood that these connections and structures exist.

Error amplifier circuit 14 includes a differential transconductance amplifier 23, a voltage reference generator 24, and a compensation resistor $R_{COMP}$ 25. Compensation resistor $R_{COMP}$ 25 and external compensation capacitor $C_{COMP}$ 7 together form an RC compensation network that is coupled to the output lead 29 of amplifier 23. The voltage reference generator 24 supplies a 1.2 volt reference voltage onto the non-inverting input lead 26 of amplifier 23. The inverting input lead 27 of amplifier is coupled to the feedback integrated circuit terminal FB 8. A fraction of the output voltage $V_{OUT}$ on node 28 is supplied by the voltage divider involving resistors 5 and 6 onto the feedback integrated circuit terminal FB 8, and to the inverting input lead 27 of amplifier 23. The error amplifier circuit 14 supplies an error voltage signal $V_E$ to the summing circuit 30 of the comparator circuit 15.

Compensation signal generator circuit 16 supplies a compensation voltage signal $V_C$ to the summing circuit 30 of the comparator circuit 15. The compensation voltage signal $V_C$ is voltage signal that has a sawtooth waveshape. Each tooth portion of the sawtooth waveshape has an initial starting voltage of zero volts that does not change for about five nanoseconds. Then, after the initial five nanosecond period, the voltage ramps downward with a constant negative slope of 100 kV per second. The ramp decreases in this way downward to smallest voltage of about minus fifty millivolts. Each rising edge of a digital oscillator signal OSC causes the compensation signal generating circuit 16 to initiate the output of one such tooth portion. The oscillator signal OSC is supplied via clock signal conductor 44 to the compensation signal generating circuit 16.

Comparator circuit 15 includes the summing circuit 30 and a differential comparator 36. The summing circuit 30 receives the error voltage signal $V_E$ from the error amplifier circuit 14 and receives the compensation voltage signal $V_C$ from the compensation signal generator circuit 16, and supplies an error and compensated error voltage signal $V_{E-C}$ onto the non-inverting input lead 37 of comparator 36. This signal $V_{E-C}$ is also referred to as the compensated error signal $V_{E-C}$. The current sense circuit 19 outputs a voltage signal $V_{CURRENT}$ whose magnitude is indicative of a magnitude of a current $I_{SW}$. This current $I_{SW}$ is a current flowing from switching node SW 38 and through integrated circuit terminal SW 10 and then through the external inductor 3. The voltage signal $V_{CURRENT}$ is supplied by the current sense circuit 19 onto the non-inverting input lead 37 of comparator 36. Comparator 36 outputs a RESET0 signal to the cycle skipping prevent circuit 31.

The current sense circuit 19 is illustrated in general schematic form. The actual current sense circuit and circuitry can take one of several different suitable forms. For example, the current sense circuit 19 can include a sense resistor that is disposed in the current path of the switching current $I_{SW}$, and the voltage drop across this sense resistor can be obtained and converted into the voltage signal $V_{CURRENT}$. For example, the current sense circuit 19 can include a current mirror that mirrors the $I_{SW}$ current, and this mirror current can in turn be converted into the voltage signal $V_{CURRENT}$. Actual switching current flow $I_{SW}$ between the switching node SW 38 and the integrated circuit terminal SW 10 need not be sensed directly, but rather another voltage or signal can be sensed that is indicative of the magnitude of the current $I_{SW}$. For example, one of the high side switch HSS 21 and low side switch LSS 22 may be a transistor that has a companion smaller current mirror transistor, and the current flow through this companion current mirror transistor can be sensed and converted into the voltage signal $V_{CURRENT}$.

Oscillator circuit 17 outputs the oscillator signal OSC that, as described above, initiates each tooth portion of the sawtooth signal $V_C$ as output by the compensation signal generator circuit 16. In the present example, the oscillator signal OSC is a zero to five volt digital 2.0 megahertz signal comprising a sequence of twenty-five nanosecond high pulses. The frequency is fixed and unchanging. The period of the signal OSC is five hundred nanoseconds. The oscillator signal OSC is output by the oscillator circuit 17 onto output lead 46 and is supplied to the cycle skipping prevent circuit 31 via clock signal conductor 44.

Latch 18 is a digital SR latch. The switch control signal SWC as output by the latch 18 is a digital signal. When the switch control signal SWC is at a digital logic high level, the high side switch HSS 21 is on and conductive. The low side switch LSS 22 is off and non-conductive due to the inverter 20 inverting the control signal for the low side switch. When the switch control signal SWC is at a digital logic low level, the low side switch LSS 22 is on and conductive and the high side switch HSS 21 is off and non-conductive. The high side and low side switches are illustrated in general schematic form. There are various ways of implementing these switches. In one example, both the switches HSS 21 and LSS 22 are N-channel field effect transistors. There are several suitable gate drive and bootstrap circuits for driving these transistors. This circuitry is conventional and is not illustrated.

Figure 2:
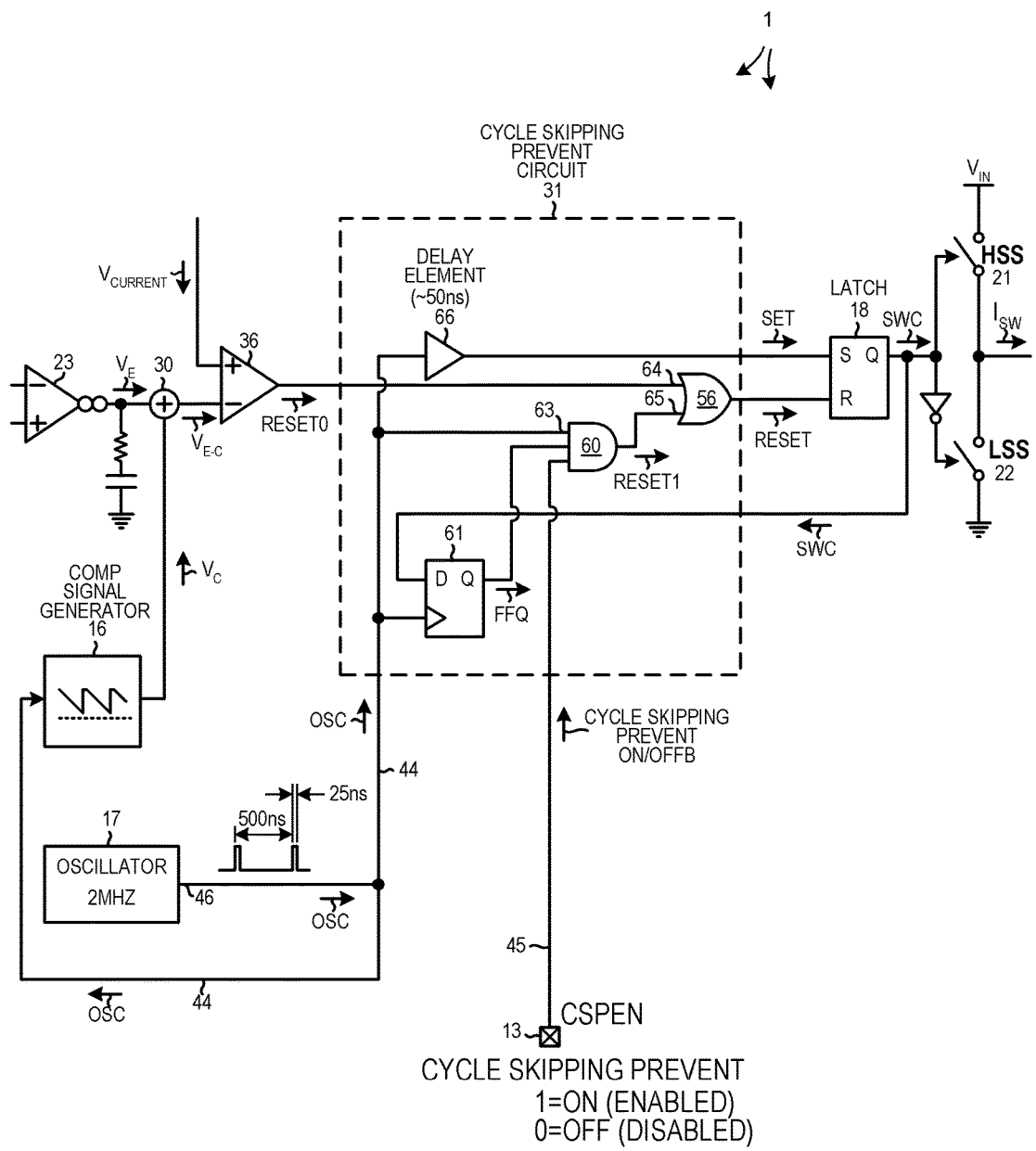
FIG. 2 is a circuit diagram that shows the cycle skipping prevent circuit of FIG. 1 in further detail.

FIG. 2 is a circuit diagram that shows the cycle skipping prevent circuit 31 of FIG. 1 in further detail. The cycle skipping prevent circuit 31 can be disabled by putting a digital logic low level signal on the cycle skipping prevent terminal CSPEN 13. When the cycle skipping prevent circuit 31 is disabled in this way, the cycle skipping prevent circuit 31 supplies a slightly delayed version of the oscillator signal OSC onto the set input lead of the latch 18. The signal name of the signal as output by the cycle skipping prevent circuit 31 onto the set input lead of the latch 18 is the signal SET. In addition, the cycle skipping prevent circuit 31 also supplies a slightly delayed version of the RESET0 signal onto the reset input lead of the latch 18. The signal name of this signal as output by the cycle skipping prevent circuit 31 onto the reset input lead of the latch 18 is the signal RESET. When the cycle skipping prevent circuit 31 is disabled in this way, then the voltage regulator control integrated circuit 2 controls the high and low side switches using peak current mode control.

For additional information on peak current mode control and on the constituent parts of the DC-to-DC voltage converter 1 circuit of FIG. 1, but for the cycle skipping prevent circuit 31, see U.S. patent application Ser. No. 15/828,337, entitled "Regulator Control Integrated Circuit Having COT and Valley Current Modes", by Masashi Nogawa, filed Nov. 30, 2017 (the entire subject matter of which is incorporated herein by reference).

Figure 3:
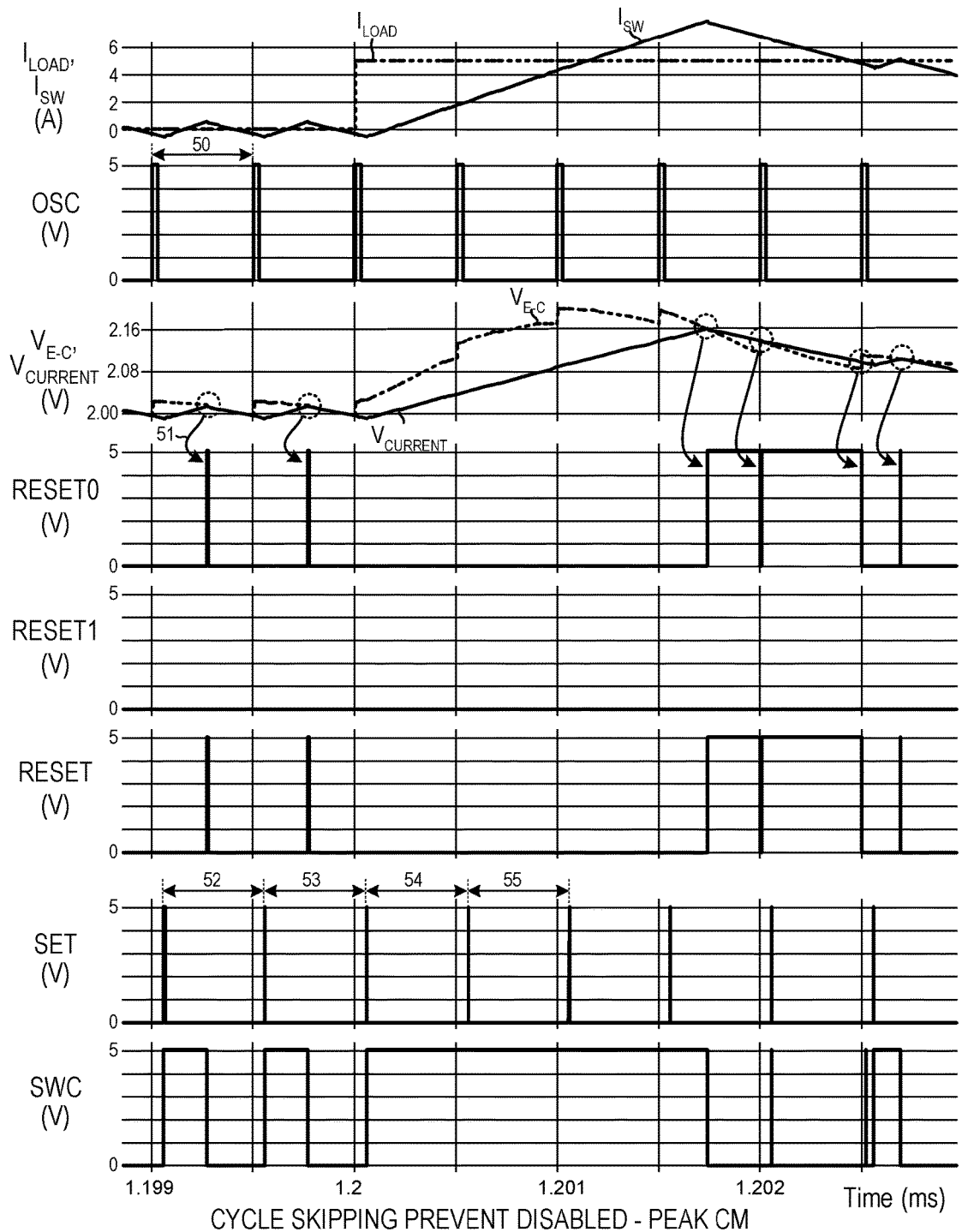
FIG. 3 is a waveform diagram that illustrates operation of the DC-to-DC converter of FIG. 1 in peak current mode.

FIG. 3 is a waveform diagram that illustrates operation of the DC-to-DC converter circuit 1 of FIG. 1 in peak current mode. The cycle skipping prevent circuit 31 is disabled. The oscillator signal OSC has a constant and fixed frequency. The first period of the oscillator signal OSC, as taken between successive rising edges of the high pulses of the oscillator signal OSC, is identified by reference numeral 50. At the beginning of each such period, the oscillator signal OSC pulses high. This high pulse is communicated through a delay element 66 of the cycle skipping prevent circuit 31 and is supplied onto the set input lead of the latch 18 in the form of a high pulse of the SET signal. The SET signal therefore has the same period and same waveshape as the oscillator signal OSC, except that the SET signal is delayed with respect to the oscillator signal OSC by the propagation delay through the delay element 66 of the cycle skipping prevent circuit 31.

Reference numeral 52 identifies the corresponding first period of the SET signal. Reference numerals 53-55 identify the next three periods of the SET signal. Each such period is taken from the rising edge of a high pulse of the SET signal to the rising edge of the very next high pulse of the SET signal.

Due to the SET signal pulsing high at the beginning of each period, the latch 18 is set at the beginning of each period. The data output signal SWC of the latch 18 is therefore at a digital logic high at the beginning of each period. The high side switch HSS 21 is therefore on a conductive, and the current $I_{SW}$ increases. The corresponding $V_{CURRENT}$ voltage signal therefore also increases because $V_{CURRENT}$ is a measure of the current $I_{SW}$. The compensated error voltage signal $V_{E-C}$ decreases as $V_{OUT}$ approaches the desired target output voltage. When the decreasing compensated error voltage signal $V_{E-C}$ decreases to the point that it falls below the voltage signal $V_{CURRENT}$, then the latch 18 is reset. If there is more current load on the DC-to-DC converter during this particular period of the SET signal, then it takes longer for the signal $V_{E-C}$ to fall below the $V_{CURRENT}$ signal. The high side switch HSS 21 is therefore on and conductive for a longer amount of time. If, on the other hand, there is less load on the DC-to-DC converter during this particular period of the SET signal, then it takes less time for the signal $V_{E-C}$ to fall below the $V_{CURRENT}$ signal. The high side switch HSS 21 is therefore on for a shorter amount of time.

It is the comparator 36 that detects when the voltage signal $V_{E-C}$ falls below the $V_{CURRENT}$ signal. When comparator 36 detects this, it asserts the voltage signal RESET0 to a digital logic high level. In FIG. 3 this occurrence during the first period 52 is identified by arrow 51. The instance of $V_{E-C}$ first falling below $V_{CURRENT}$ is indicated by the dashed circle above arrow 51. The digital logic high RESET0 signal as output by comparator 36 passes through the OR gate 56 of the cycle skipping prevent circuit 31. The voltage signal RESET therefore transitions to a digital logic level high and the latch 18 is reset. The data output signal SWC of the latch 18 therefore transitions from a digital logic high level to a digital logic low level. This turns off the high side switch HSS 21. This condition persists until the end of the period 52 of the SET signal.

When the load on the DC-to-DC converter is increased quickly, however, the latch 18 may not be reset at the end of a period of the SET signal. In FIG. 3, the waveform labeled $I_{LOAD}$ represents the load on the DC-to-DC converter. The load has suddenly stepped up at about the time of the beginning of the third period 54 of the SET signal. The latch 18 is set at the beginning of the period as described above in connection with period 52, but once the latch 18 is set the voltage signal $V_{E-C}$ does not ever fall below the voltage signal $V_{CURRENT}$ during the period 54. As a result, the RESET0 signal as output by the comparator 36 never transitions to a digital logic high level, and the RESET signal as supplied to the latch 18 is not asserted during the period 54. As can be seen from the RESET waveform in the waveform diagram of FIG. 3, there are several periods (of the SET signal) during which there is no a high pulse of the RESET signal. Note also that the switch control signal SWC does not transition low during these periods. Note also that the current flow $I_{SW}$ varies up and down in the first two periods 52 and 53 and therefore has a principal frequency component that is the same as the frequency of the oscillator signal OSC. But note that in period 54 and the next two periods after that that the current flow $I_{SW}$ does not vary up and down, but rather rises continuously. It is recognized that this increases the magnitude of a frequency component whose frequency is lower than the frequency of the oscillator signal OSC. If the latch 18 is not reset for two periods, then this frequency component is at a frequency that is roughly half of the 2.0 MHz frequency of the oscillator signal OSC. If the latch 18 is not reset for three periods, then this frequency component is at a frequency that is roughly one third of the 2.0 MHz frequency of the oscillator signal OSC.

It is recognized by the inventor that one application of a DC-to-DC converter such as the DC-to-DC converter 1 of FIG. 1 is in an automotive application. The DC-to-DC converter 1 may, for example, be disposed in or near the dashboard of an automobile. In order to ensure that the radio receiver of the automobile does not pick up undesired noise emanating from such DC-to-DC converters, the DC-to-DC converter should emit a minimal amount of noise in the AM frequency band. This AM frequency band can be considered to extend from about 450 kilohertz to about 2.0 megahertz. Each automobile manufacturer seems to have its own requirements as to the maximum amount of noise that a DC-to-DC converter can emit in this AM frequency band, and the frequency profile and characteristics of such noise, but in earlier years the frequency of the oscillator signal OSC was generally lower than 450 kilohertz. More recently, however, due to improvements in control and switching circuitry, designers of DC-to-DC converters for this automotive purpose have started to set the frequency of the oscillator signal OSC of peak current mode controlled DC-to-DC converters at or above the upper end of the AM frequency band. The frequency of the oscillator signal OSC cannot be located in the AM frequency band, but it can be set above the AM frequency band. It would appear that noise generated by the DC-to-DC converter would therefore primarily be at frequencies above the AM frequency band and would not interfere with radio operation. The inventor, however, has recognized that a problem may nevertheless exist in such DC-to-DC converter circuits employing peak current mode control, when the load on the DC-to-DC converter exhibits repeated sudden increases and/or sudden decreases. As explained above in connection with FIG. 3, in some circuits the latch that outputs the switch control signal SWC is not reset in some periods of the SET signal. Accordingly, an amount of noise that is at half or one third of the 2.0 megahertz frequency of the oscillator signal OSC may be generated, and this noise may be in the AM frequency band. The generation of this noise is undesirable in cases in which the DC-to-DC converter is to be used in the automotive application.

Figure 4:
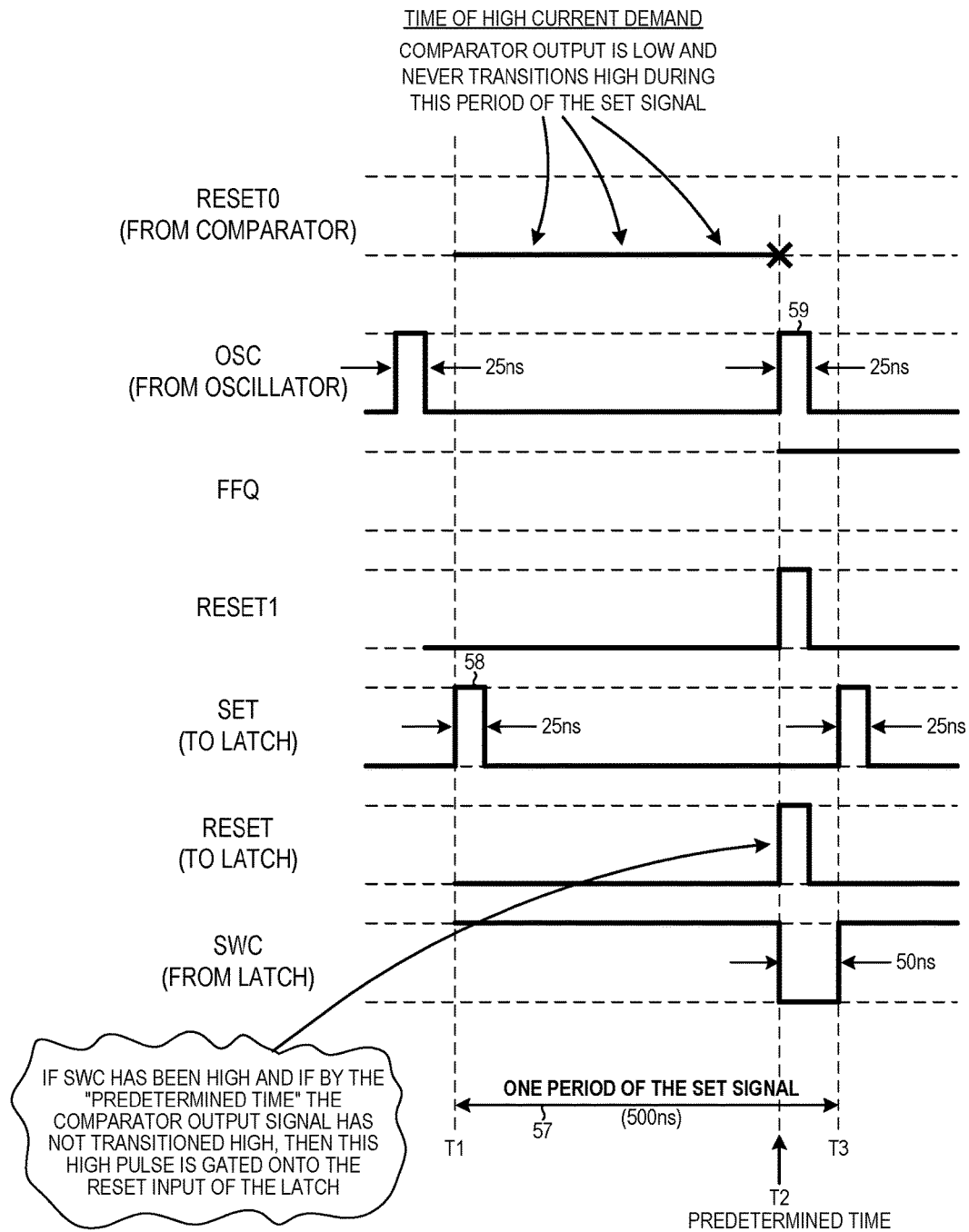
FIG. 4 is a simplified waveform diagram that illustrates operation of the cycle skipping prevent circuit of FIG. 1.

In accordance with one novel aspect, the cycle skipping prevent circuit 31 is employed. Operation of the cycle skipping prevent circuit 31 is explained in connection with FIG. 4. The cycle skipping prevent circuit 31 is enabled by placing a digital logic high signal on the cycle skipping prevent enable terminal CSPEN 13 and conductor 45. Due to the signal propagation delay through the delay element 66, the signal SET as it is supplied onto the set input lead of the latch 18 is a delayed version of the oscillator signal OSC. In the present example, the delay through delay element 66 is about fifty nanoseconds. One period 57 of the SET signal, taken from rising edge of the SET signal at time T1 to the next rising edge of the SET signal at time T3, is five hundred nanoseconds. This period 57 of the SET signal is one of the periods illustrated in FIG. 5. The latch 18 is initially set at time T1 by the high pulse 58 of the signal SET at the beginning of the period 57. If the high side switch HSS21 is on and conductive as indicated by the switch control signal SWC being at a digital logic high level, and if the RESET0 signal as output by comparator 36 remains low and never transitions high up until the time T2 (of the rising edge of the oscillator signal OSC), then the cycle skipping prevent circuit 31 gates the high pulse 59 of the signal OSC through AND gate 60 and through OR gate 56 and onto the reset input lead of the latch 18. The D flip-flop 61, which is clocked by the rising edge of the oscillator signal OSC at the "predetermined time" T2, effectively tests the value of the switch control signal SWC. If the signal SWC is at a digital logic high at this "predetermined time" T2, then the RESET0 signal could not have transitioned high during this period 57 at any time after the falling edge of the high SET pulse 58. Accordingly, if flip-flop 61 immediately after the "predetermined time" T2 outputs a digital logic high by asserting the signal FFQ to a digital logic high, then the high pulse of the oscillator signal OSC as it is present on the upper input lead 63 of AND gate 60 can pass through the AND gate 60. The digital logic signal present on the upper input lead 64 of OR gate 56 is a digital logic low level, but the high pulse that is now supplied onto the lower input lead 65 of the OR gate 56 can pass through the OR gate 56, and is supplied in the form of the RESET signal onto the reset input lead of latch 18. This causes the latch 18 to be reset. The resetting of the latch 18 immediately after time T2 causes the data output signal SWC of the latch 18 to transition to a digital logic low, and this in turn causes the high side switch HSS 21 to be turned off. The high side switch HSS 21 thereafter remains off until the end of the period 57 when the set signal SET pulses high the next time at time T3. The time between T2 and T3 is the propagation delay through delay element 66, which is about fifty nanoseconds.

If during this period 57 the comparator 36 had detected that the compensated error signal $V_{E-C}$ had fallen below the $V_{CURRENT}$ signal before time T2, then the signal RESET0 would have transitioned high before the "predetermined time" T2. This digital logic high signal would have passed through OR gate 56 and would have caused the latch 18 to have been reset. In such a case the high side switch HSS 21 would have been turned off for at least some remaining part of the period 57, and there would have been no reason for the cycle skipping prevent circuit 31 to inject a high pulse starting at time T2. Indeed, when the flip-flop 61 would have been clocked at time T2, it would have clocked in a digital logic level low signal because the latch 18 would have already been reset. As a result of the flip-flop 61 outputting a digital logic low signal, the AND gate 60 would not have gated the high pulse 59 through to the OR gate 56.

Accordingly it is seen that the cycle skipping prevent circuit 31 guarantees that the latch 18 is reset and that the high side switch HHS 21 is turned off for at least some small terminal part of each period of the SET signal. Because the SET signal is a delayed version of the oscillator signal OSC, and because the oscillator signal OSC has a fixed frequency (in this case, 2.0 megahertz), the cycle skipping explained above in connection with FIG. 3 does not occur. The undesirable noise problem due to cycle skipping is therefore also avoided.

Figure 5:
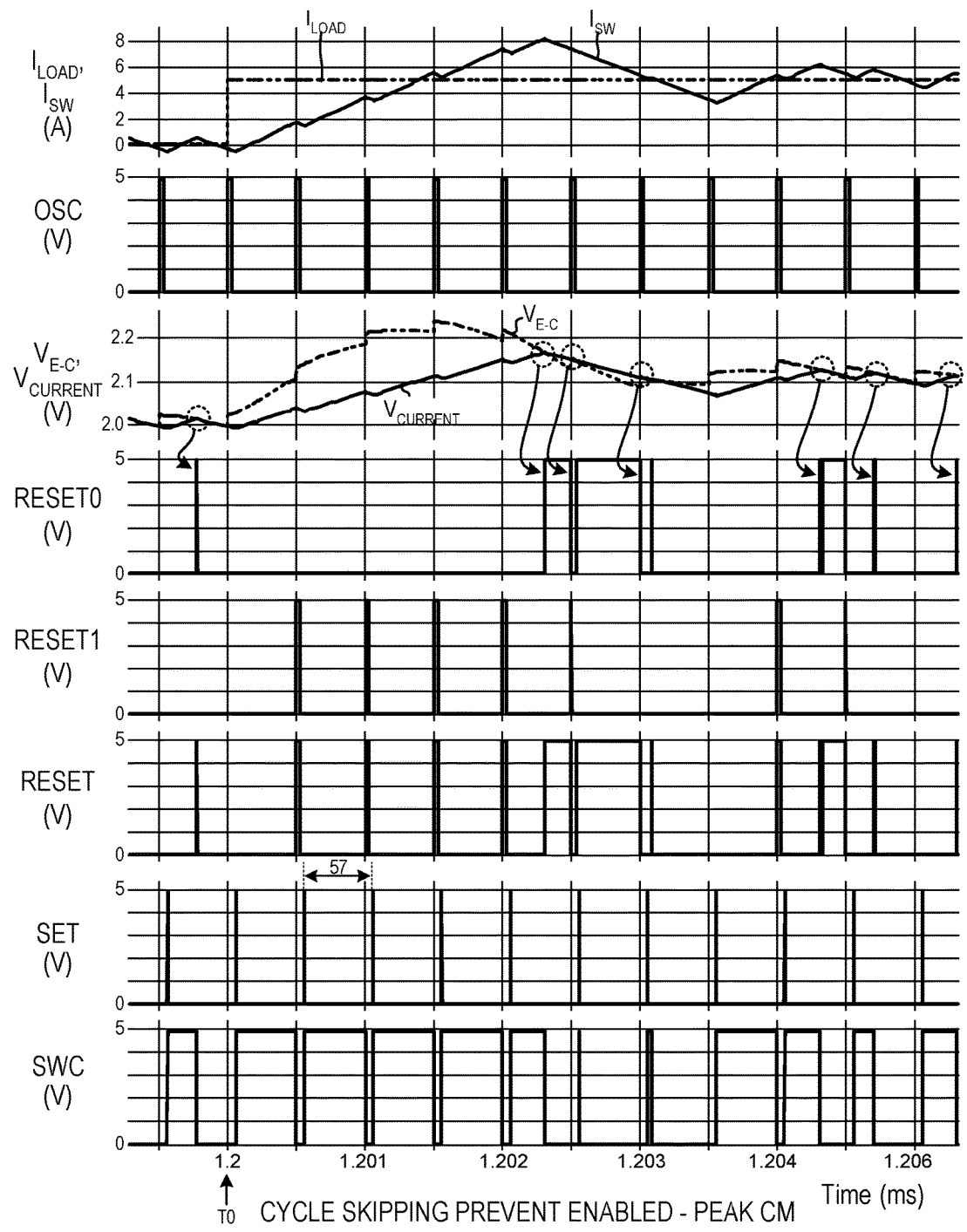
FIG. 5 is a more extensive waveform diagram that illustrates operation of the DC-to-DC converter of FIG. 1 when the cycle skipping prevent circuit is enabled.

FIG. 5 is a more extensive waveform diagram that illustrates operation of the DC-to-DC converter 1 of FIG. 1 when the cycle skipping prevent circuit 31 is enabled. Despite the fact that the load on the DC-to-DC converter is suddenly increased as indicated by the step up in the $I_{LOAD}$ waveform at time T0, the latch 18 is nevertheless reset during each and every period of the SET signal.

The technique and method described above for preventing cycle skipping is not limited to use in DC-to-DC converters that employ peak current mode control. For example, the technique and method for preventing cycle skipping sees use in DC-to-DC converters that employ valley current mode control.

Figure 6:
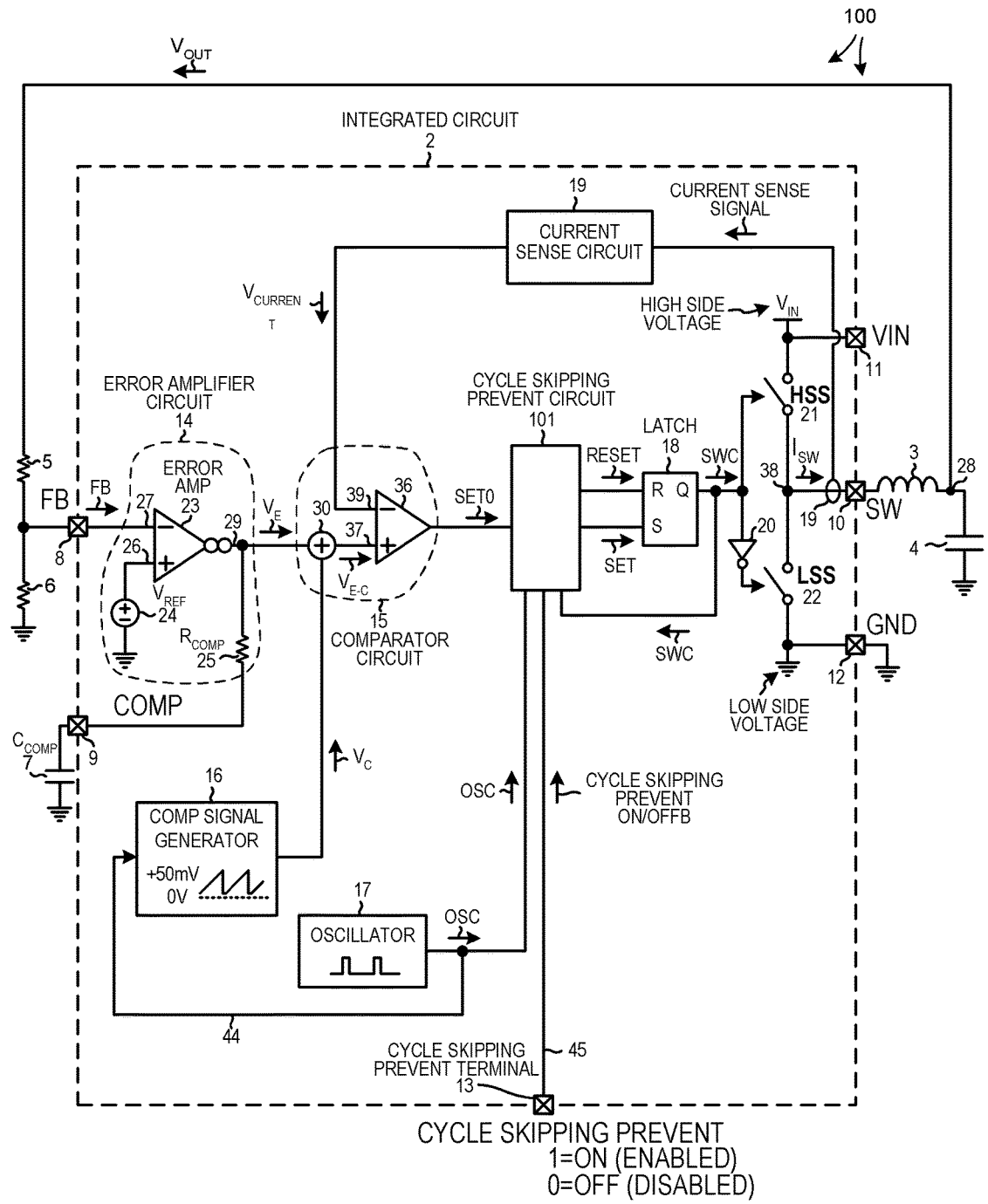
FIG. 6 is a circuit diagram of a DC-to-DC converter that employs valley current mode control and involves a cycle skipping prevent circuit in accordance with a second novel aspect.

FIG. 6 is a circuit diagram that illustrates a DC-to-DC converter 100 in accordance with a second novel aspect. The DC-to-DC converter 100 includes a novel cycle skipping prevent circuit 101 and employs valley current mode control. The compensation signal $V_C$ as output by the compensation signal generator circuit 16 has sawtooth waveshape, but each individual tooth portion of the waveshape has an increasing slope. The compensated error signal $V_{E-C}$ is received onto the non-inverting input lead 37 of comparator 36, and the $V_{CURRENT}$ voltage signal is received onto the inverting input lead 39 of comparator 36. The signal output by the comparator 36, rather than being a signal RESET0 as in the case of FIG. 1, is a signal SET0.

Figure 7:
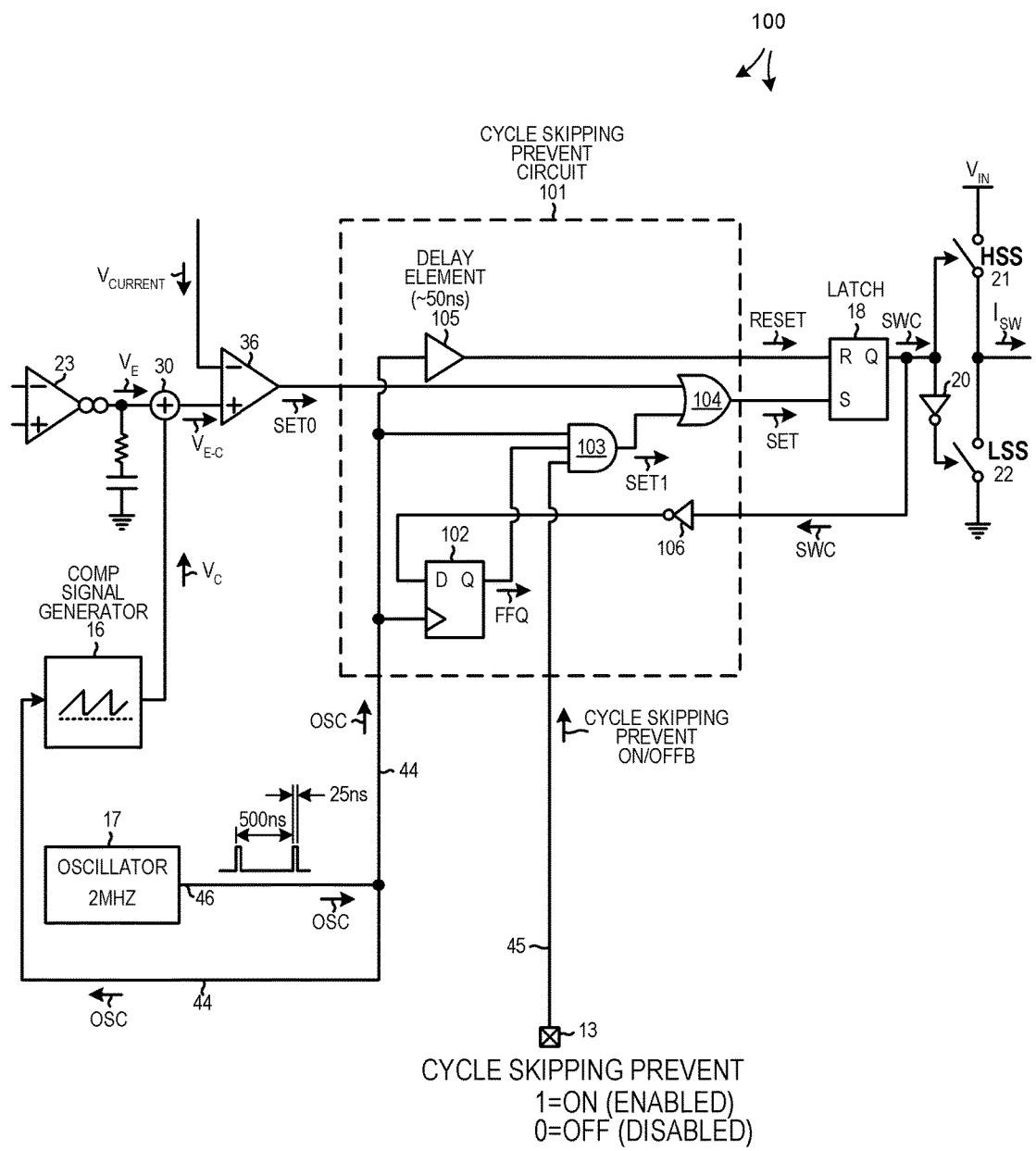
FIG. 7 is a circuit diagram that illustrates the cycle skipping prevent circuit of FIG. 6 in further detail.

FIG. 7 is a circuit diagram that illustrates the cycle skipping prevent circuit 101 of FIG. 6 in further detail. The cycle skipping prevent circuit 101 includes a flip-flop 102, an AND gate 103, an OR gate 104, a delay element 105, and an inverter 106. Note that the SET signal output from OR gate 104 is supplied onto the set input lead of the latch 18, and that the RESET signal output by the delay element 105 is supplied onto the reset input lead of the latch 18. If the latch 18 is not set by a predetermined time in a period of the RESET signal, then the cycle skipping prevent circuit 101 gates a set pulse onto the set input lead of the latch 18. The latch 18 is reset (i.e., reset wins) if the signal on the set input lead of the latch is at a digital logic high and the signal on the reset input lead of the latch is also at a digital logic high.

Figure 8:
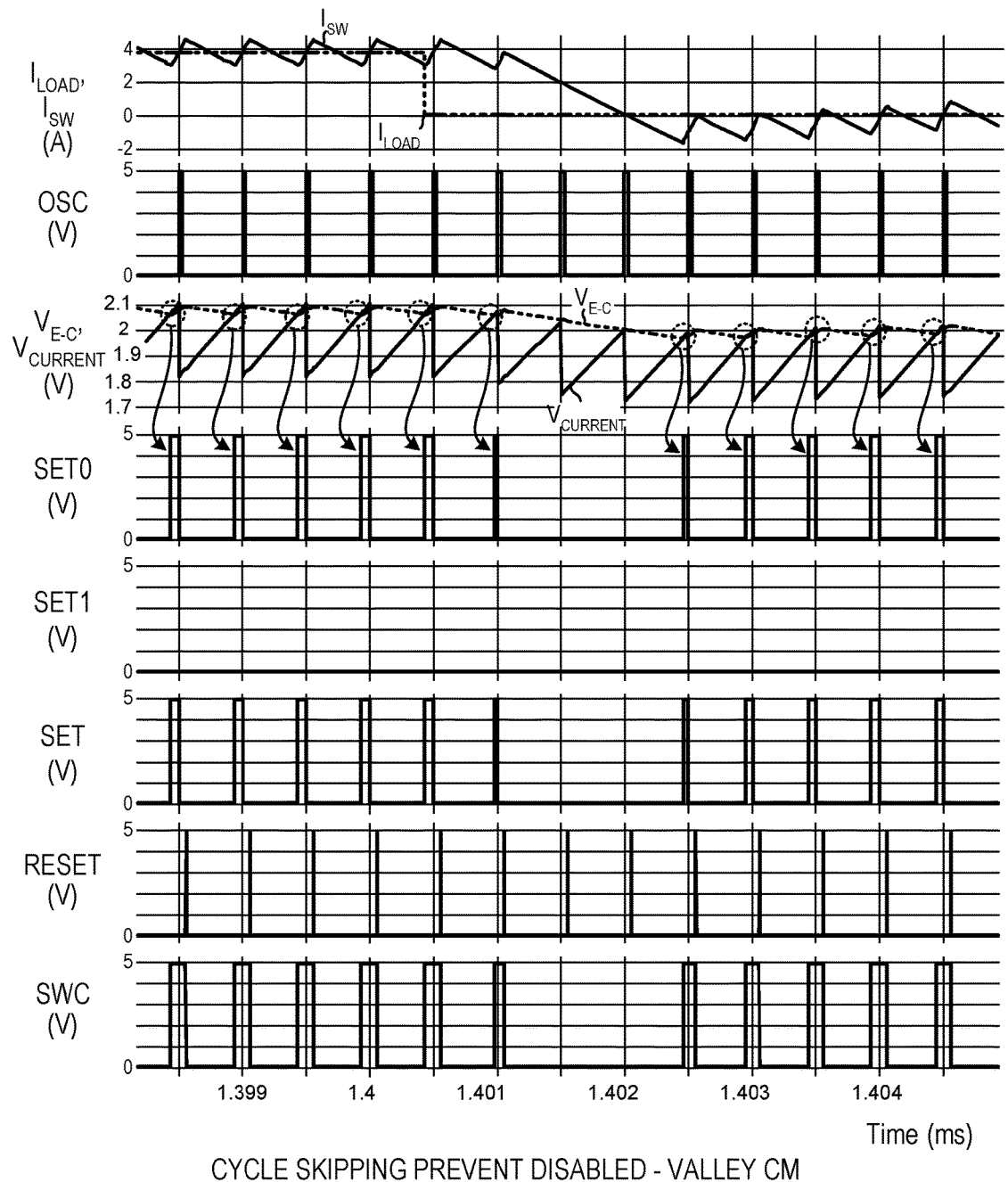
FIG. 8 is a waveform diagram that illustrates an operation of the DC-to-DC converter of FIG. 6 when the cycle skipping prevent circuit is disabled.

FIG. 8 is a waveform diagram that illustrates an operation of the DC-to-DC converter 100 of FIG. 6 when the cycle skipping prevent circuit 101 is disabled. Note that when there is a sudden decrease in load on the DC-to-DC converter 100 as indicated by the step down in the $I_{LOAD}$ waveform, that there are then several periods of the signal RESET during which the SET signal does not transition high and the latch 18 is not set. Accordingly, the $I_{SW}$ current does not rise again during the period of the RESET signal, but rather is decreases at a constant rate for multiple periods.

Figure 9:
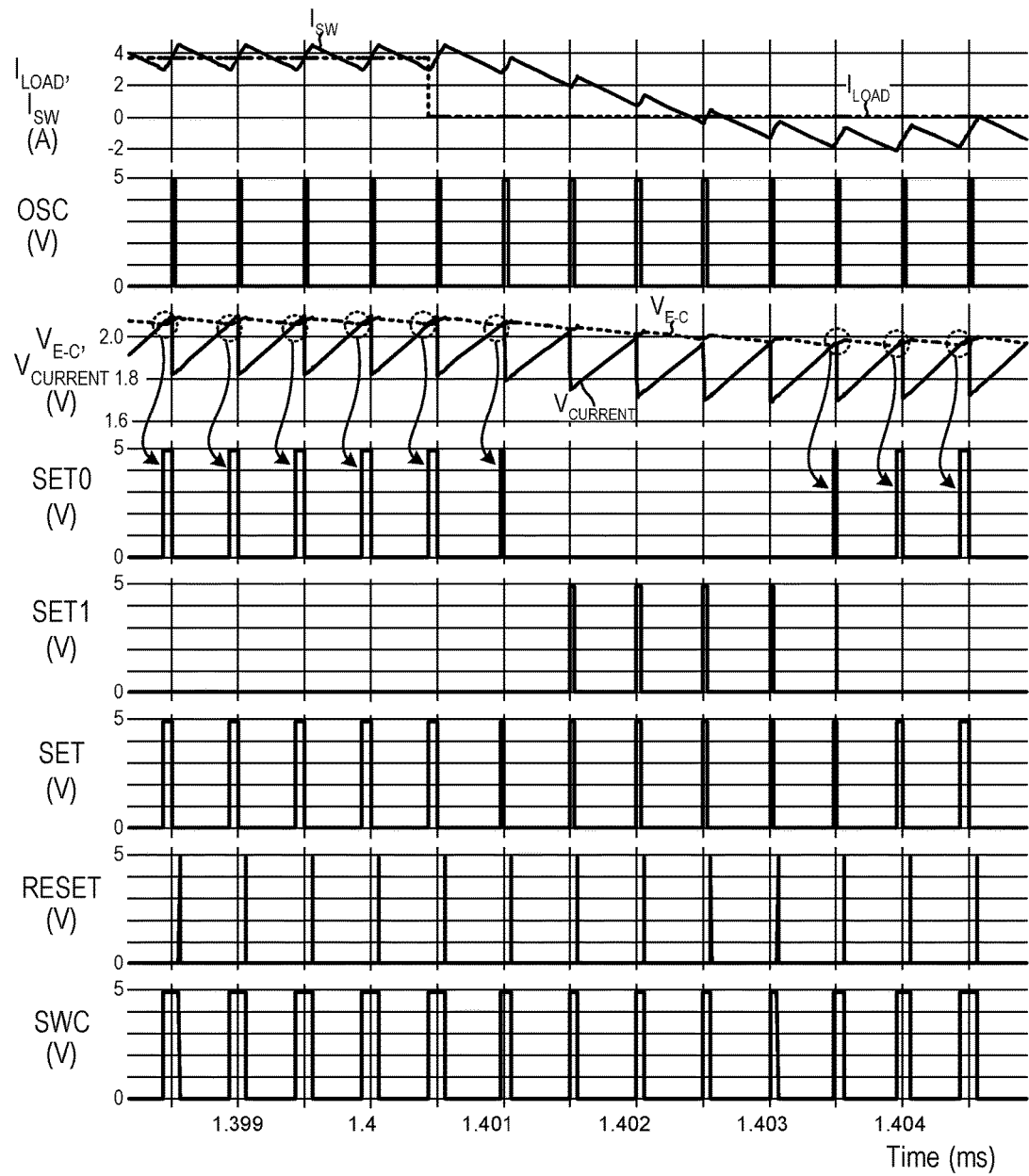
FIG. 9 is a waveform diagram that illustrates an operation of the DC-to-DC converter of FIG. 6 when the cycle skipping prevent circuit is enabled.

FIG. 9 is a waveform diagram that illustrates an operation of the DC-to-DC converter 100 of FIG. 6 when the cycle skipping prevent circuit 101 is enabled. There is a sudden decrease in load on the DC-to-DC converter 100 as indicated by the step down in the $I_{LOAD}$ waveform. Despite this sudden decrease in load, the SET signal nevertheless pulses every period of the signal RESET and the latch 18 is set once every period of the signal RESET. The current $I_{SW}$ does decreases at a constant rate for multiple periods but rather stair steps downward as illustrated.

Although certain specific embodiments are described above for instructional purposes, the teachings of this patent document have general applicability and are not limited to the specific embodiments described above. In some integrated circuit realizations of the voltage regulator control circuit, the high side switch and the low side switch are integrated onto the integrated circuit, whereas in other realizations the high side switch and the low side switch are external to the integrated circuit. Likewise, the oscillator may be integrated onto the integrated circuit, or it may be external to the integrated circuit. Likewise, the current sense circuit may be integrated onto the integrated circuit, or it or part of it may be external to the integrated circuit. Although a latch is disclosed as the sequential logic element that outputs the switch control signal, the sequential logic element can be another type of sequential logic element such as another type of latch or a flip-flop. Accordingly, various modifications, adaptations, and combinations of various features of the described embodiments can be practiced without departing from the scope of the invention as set forth in the claims.

What is claimed is:

1. A voltage regulator control circuit for controlling a DC-to-DC switching converter using a peak current (PC) mode, wherein the voltage regulator control circuit comprises:
   a sequential logic element having a set input lead, a reset input lead, and an output lead;
   a current sense circuit that outputs a voltage signal $V_{CURRENT}$ indicative of a magnitude of a current;
   a comparator circuit that has a first input lead, a second input lead, and an output lead, wherein the first input lead receives the voltage signal $V_{CURRENT}$ from the current sense circuit, wherein the comparator circuit outputs a RESET0 signal onto the comparator output lead;
   a signal conductor, wherein an oscillator signal OSC is present on the signal conductor; and
   a cycle skipping prevent circuit that receives the RESET0 signal and that receives the oscillator signal OSC, wherein the cycle skipping prevent circuit supplies a delayed version of the oscillator signal OSC onto the set input lead of the sequential logic element in a form of a signal SET, wherein the signal SET has a period that extends from a rising leading edge of a high pulse of the signal SET to a rising leading edge of a subsequent high pulse of the signal SET, wherein the cycle skipping prevent circuit gates a digital logic high signal as output by the comparator circuit onto the reset input lead of the sequential logic element if the RESET0 signal as output by the comparator circuit is at a digital logic high level, wherein in the period if the RESET0 signal has not transitioned to the digital logic high level by a predetermined time in the period then the cycle skipping prevent circuit gates the high pulse onto the reset input lead of the sequential logic element.

2. The voltage regulator control circuit of claim 1, wherein the cycle skipping prevent circuit gates the high pulse onto the reset input lead of the sequential logic element such that the digital logic high level on the reset input lead then returns to a digital logic low level before an end of the period.

3. The voltage regulator control circuit of claim 1, wherein the predetermined time is a time of an edge of the oscillator signal OSC.

4. The voltage regulator control circuit of claim 1, wherein the cycle skipping prevent circuit comprises:
   a digital logic gate that has an input lead and an output lead, wherein the digital logic gate receives the RESET0 signal onto its input lead, wherein the output lead of the digital logic gate is coupled to the reset input lead of the sequential logic element.

5. The voltage regulator control circuit of claim 1, wherein the cycle skipping prevent circuit comprises:
   a delay element that receives the oscillator signal OSC and that supplies the signal SET onto the set input lead of the sequential logic element; and
   a flip-flop having a clock input lead and a data input lead, wherein the data input lead of the flip-flop is coupled to the output lead of the sequential logic element, wherein the oscillator signal OSC is supplied onto the clock input lead of the flip-flop.

6. The voltage regulator control circuit of claim 1, wherein the cycle skipping prevent circuit receives a cycle skipping prevent enable signal, wherein the cycle skipping prevent enable signal is a single-bit digital signal, wherein if the cycle skipping prevent enable signal has a first digital logic level then the cycle skipping prevent circuit is enabled to gate the high pulse onto the set input lead of the sequential logic element if the RESET0 signal has not transitioned to the digital logic high level by the predetermined time in the period, wherein if the cycle skipping prevent enable signal has a second digital logic level then the cycle skipping prevent circuit is disabled from gating the high pulse onto the set input lead of the sequential logic element if the RESET0 signal has not transitioned to the digital logic high level by the predetermined time in the period.

7. The voltage regulator control circuit of claim 1, wherein the oscillator signal OSC is at the digital logic high level for less than twenty percent of the period, and is at a digital logic low level for more than eighty percent of the period.

8. The voltage regulator control circuit of claim 1, wherein the sequential logic element is a latch.

9. The voltage regulator control circuit of claim 1, wherein the comparator circuit receives a compensated error signal $V_{E-C}$ onto its second input lead.

10. The voltage regulator control circuit of claim 1, wherein the DC-to-DC switching converter includes a high side switch, wherein a digital signal output by the sequential logic element onto the output lead of the sequential logic element controls the high side switch.

11. A voltage regulator control circuit for controlling a DC-to-DC switching converter, wherein the voltage regulator control circuit comprises:
a sequential logic element having a set input lead, a reset input lead, and an output lead;
a comparator circuit that has a first input lead, a second input lead, and an output lead, wherein the first input lead receives a voltage signal $V_{CURRENT}$, wherein the voltage signal $V_{CURRENT}$ is indicative of a current flow in the DC-to-DC switching converter;
a flip-flop having an oscillator signal input lead, a data input lead, and a data output lead;
first logic gate circuitry having a first input lead, a second input lead, and an output lead, wherein the second input lead of the first logic gate circuitry is coupled to the data output lead of the flip-flop;
second logic gate circuitry having a first input lead, a second input lead, and an output lead, wherein the second input lead of the second logic gate circuitry is coupled to receive a first signal from the output lead of the first logic gate circuitry, wherein the first input lead of the second logic gate circuitry is coupled to receive a second signal from the output lead of the comparator circuit, wherein the output lead of the second logic gate circuitry is coupled to supply a third signal onto the reset input lead of the sequential logic element;
a delay element having an input lead and an output lead, wherein the output lead of the delay element is coupled to supply a fourth signal onto the set input lead of the sequential logic element; and
a signal conductor that is coupled to the oscillator signal input lead of the flip-flop and to the first input lead of the first logic gate circuitry and to the input lead of the delay element.

12. The voltage regulator control circuit of claim 11, wherein the DC-to-DC switching converter includes a high side switch, wherein a digital signal output by the sequential logic element onto the output lead of the sequential logic element controls the high side switch.

13. The voltage regulator control circuit of claim 11, wherein an error compensated signal $V_{E-C}$ is present on the second input lead of the comparator circuit.

14. The voltage regulator control circuit of claim 11, wherein an oscillator signal OSC is present on the signal conductor, wherein the oscillator signal OSC has a period, wherein the oscillator signal OSC is at a first digital logic level for less than twenty percent of the period, and is at a second digital logic level for more than eighty percent of the period.

15. The voltage regulator control circuit of claim 11, wherein the first logic gate circuitry includes a first logic gate, and wherein the second logic gate circuitry includes a second logic gate.

16. The voltage regulator control circuit of claim 11, further comprising:
a cycle skipping prevent circuit disable signal conductor, wherein if a second digital logic level is present on the cycle skipping prevent circuit disable signal conductor then the first signal on the output lead of the first logic gate circuitry is fixed and unchangeable, whereas if a first digital logic level is present on the cycle skipping prevent circuit disable signal conductor then the first signal present on the output lead of the first logic gate circuitry is changeable.

17. A voltage regulator control circuit for controlling a DC-to-DC switching converter, wherein the voltage regulator control circuit comprises:
a sequential logic element having a set input lead, a reset input lead, and an output lead;
a comparator circuit that has a first input lead, a second input lead, and an output lead, wherein the first input lead receives a voltage signal $V_{CURRENT}$, wherein the voltage signal $V_{CURRENT}$ is indicative of a magnitude of a current flowing in the DC-to-DC switching converter, wherein the comparator circuit outputs a RESET0 signal onto the comparator output lead;
a signal conductor, wherein an oscillator signal OSC is present on the signal conductor; and
means for receiving the RESET0 signal and for receiving the oscillator signal OSC, wherein the means is also for supplying a delayed version of the oscillator signal OSC onto the set input lead of the sequential logic element in a form of a signal SET, wherein the signal SET has a period that extends from a rising leading edge of a high pulse of the signal SET to a rising leading edge of a subsequent high pulse of the signal SET, wherein the means is also for gating a digital logic high signal as output by the comparator circuit onto the set input lead of the sequential logic element if the RESET0 signal as output by the comparator circuit is at a digital logic high level, wherein in the period if the RESET0 signal has not transitioned to the digital logic high level by a predetermined time in the period then the means gates the high pulse onto the set input lead of the sequential logic element.

18. A voltage regulator control circuit for controlling a DC-to-DC switching converter using a peak current (PC) mode, wherein the voltage regulator control circuit is an integrated circuit, wherein the DC-to-DC switching converter comprises an inductor, wherein a switching current $I_{SW}$ flows through the inductor, and wherein the voltage regulator control circuit comprises:
a sequential logic element having a set input lead, a reset input lead, and an output lead;
a first signal conductor that carries a voltage signal $V_{CURRENT}$, wherein the voltage signal $V_{CURRENT}$ is indicative of a magnitude of the switching current $I_{SW}$;
a comparator circuit that has a first input lead, a second input lead, and an output lead, wherein the first input lead receives the voltage signal $V_{CURRENT}$ and that outputs a RESET0 signal onto the comparator output lead;
a second signal conductor that carries an oscillator signal OSC; and
a cycle skipping prevent circuit that receives the RESET0 signal and that receives the oscillator signal OSC, wherein the cycle skipping prevent circuit supplies a delayed version of the oscillator signal OSC onto the set input lead of the sequential logic element in a form of a signal SET, wherein the signal SET has a period that extends from a rising leading edge of a high pulse of the signal SET to a rising leading edge of a subsequent high pulse of the signal SET, wherein the cycle skipping prevent circuit gates a digital logic high signal as output by the comparator circuit onto the reset input lead of the sequential logic element if the RESET0 signal as output by the comparator circuit is at a digital logic high level, wherein in the period if the RESET0 signal has not transitioned to the digital logic high level by a predetermined time in the period then the cycle skipping prevent circuit gates the high pulse onto the reset input lead of the sequential logic element.

19. The voltage regulator control circuit of claim 18, further comprising:
 a switching integrated circuit terminal SW; and
 a high side switch HSS that is coupled to the switching integrated circuit terminal SW, wherein the high side switch HSS receives a control signal from the sequential logic element, wherein the switching integrated circuit terminal SW and the high side switch HSS are both disposed on the integrated circuit.

20. The voltage regulator control circuit of claim 18, further comprising:
 a current sense circuit that outputs the voltage signal $V_{CURRENT}$, wherein at least a part of the current sense circuit is disposed on the integrated circuit.

21. The voltage regulator control circuit of claim 18, further comprising:
 a third conductor that carries a cycle skipping prevent enable signal, wherein the cycle skipping prevent enable signal is a single-bit digital signal, wherein if the cycle skipping prevent enable signal has a first digital logic level then the cycle skipping prevent circuit is enabled whereas if the cycle skipping prevent enable signal has a second digital logic level then the cycle skipping prevent circuit is disabled, wherein the third conductor is disposed on the integrated circuit.

22. The voltage regulator control circuit of claim 18, further comprising:
 a cycle skipping prevent enable integrated circuit terminal CSPEN, wherein the cycle skipping prevent enable integrated circuit terminal CSPEN receives a cycle skipping prevent enable signal onto the integrated circuit, wherein the cycle skipping prevent enable signal is a single-bit digital signal, wherein if the cycle skipping prevent enable signal has a first digital logic level then the cycle skipping prevent circuit is enabled whereas if the cycle skipping prevent enable signal has a second digital logic level then the cycle skipping prevent circuit is disabled.

\* \* \* \* \*